United States Patent [19]
Davies

[11] Patent Number: 5,079,054
[45] Date of Patent: Jan. 7, 1992

[54] MOISTURE IMPERMEABLE SPACER FOR A SEALED WINDOW UNIT

[75] Inventor: Lawrence W. Davies, Winnipeg, Canada

[73] Assignee: Ominiglass Ltd., E. Winnipeg, Canada

[21] Appl. No.: 441,143

[22] Filed: Nov. 27, 1989

Related U.S. Application Data

[63] Continuation-in-part of Ser. No. 374,692, Jul. 3, 1989, abandoned.

[51] Int. Cl.$^5$ .................. B29D 22/00; E06B 3/24
[52] U.S. Cl. ..................... 428/35.8; 428/34; 428/35.9; 428/36.4; 428/213; 52/172; 52/790
[58] Field of Search .................. 156/107, 109; 52/171, 52/172, 788, 790; 428/34, 35.7, 35.8, 36.1, 36.2, 36.6, 36.9, 35.9, 36.4, 213

[56] References Cited

U.S. PATENT DOCUMENTS

| | | | |
|---|---|---|---|
| 4,015,394 | 4/1977 | Kessler | 52/790 |
| 4,564,540 | 1/1986 | Davies et al. | 52/172 |
| 4,658,553 | 4/1987 | Shinagawa | 52/172 |
| 4,745,711 | 5/1988 | Box | 52/172 |
| 4,788,088 | 11/1988 | Kohl | 428/34.5 |
| 4,831,799 | 5/1989 | Glover et al. | 52/172 |

FOREIGN PATENT DOCUMENTS

| | | |
|---|---|---|
| 1222905 | 6/1987 | Canada . |
| 0017254 | 10/1980 | European Pat. Off. . |
| 0113209 | 7/1984 | European Pat. Off. . |
| 1924110 | 5/1971 | Fed. Rep. of Germany . |
| 3302659 | 8/1984 | Fed. Rep. of Germany . |
| 8802738 | 7/1988 | Fed. Rep. of Germany . |
| 2558102 | 7/1985 | France . |
| 2152869A | 8/1985 | United Kingdom . |
| 2203814A | 10/1988 | United Kingdom . |

*Primary Examiner*—Ellis P. Robinson
*Assistant Examiner*—Donald J. Loney
*Attorney, Agent, or Firm*—Adrian D. Battison; Stanley G. Ade; Murray E. Thrift

[57] ABSTRACT

A spacer for separating panes of glass in a sealed window unit is formed of a thermosetting resin reinforced longitudinally with continuously extending glass fibres. A layer of a foil material is introduced into the part during the pultrusion process so that the foil is embedded within the part and defines a moisture impermeable layer in the outer wall of the part. The foil can be carried into the part on a layer of paper or polyester which combines with the resin in a bonding action.

3 Claims, 3 Drawing Sheets

MOISTURE IMPERMEABLE SPACER FOR A SEALED WINDOW UNIT

This application is a continuation-in-part of application, Ser. No. 374,692, filed July 3, 1989 and now abandoned.

BACKGROUND OF THE INVENTION

This invention relates to a method of manufacturing a pultruded part which is particularly but not exclusively developed for manufacturing a spacer for a sealed window unit which is manufactured so that it is moisture impermeable.

As is well known, sealed window units comprise two glass panes which are coextensive so that the edges are overlying, a spacer element which is arranged at each edge of the panes and holds the panes in the properly spaced relationship and a sealing material which is applied around the exterior of the spacer. It is essential that moisture does not enter the area between the panes since that moisture will then condense on one of the panes and prevent the proper transparency of the window unit. For this purpose a dessicant is generally introduced into the hollow interior of the spacer and the spacer is designed either by a slot or by other techniques so that the moisture that remains within the area between the panes can escape for collection by the desicant. It is also essential that the spacer is sealed relative to the panes so that no moisture can enter from the exterior edges of the window unit.

Conventionally such spacers have been manufactured from aluminum which is entirely moisture impermeable. Aluminum spacers have a number of disadvantages however particularly in relation to the thermal expansion characteristics and the relatively high thermal conductivity.

Many attempts have been made therefore over the years to design a spacer which is manufactured from other materials. Many of these attempts have failed completely. One attempt which has met with a significant degree of success is that shown in European Patent Publication No. 113209 which shows a spacer which is manufactured by pultrusion from a thermosetting resin material which is reinforced by fibers which are preferably glass fibers. This spacer has the advantage of an improved thermal conductivity and a coefficient of thermal expansion which is much closer to that of glass.

One problem which has arisen with a product of this type is that the resin material is not itself impermeable to moisture so that it is possible for moisture to penetrate the part known as moisture vapor transmission or MVT so that the moisture can enter the area between the panes and interfere with the proper usage of the product.

One solution to this problem has been to replace the conventional sealant around the outside of the spacer by an improved sealant which itself is impermeable to moisture and thus prevents the moisture from reaching the spacer itself. However this disadvantage of the poorer MVT of the spacer has led to some adverse criticism and a reduction in the success which should otherwise be achieved in view of the improvements in other qualities relative to the conventionally used aluminum.

It is known that foil material when applied as a layer on an outer surface of a part can provide a complete impermeability to moisture. Attempts have therefore been made to adhesively attach a foil onto the exterior of a part and particularly to the exterior of a spacer formed from a resin material so as to provide for the spacer an improved MVT. However this technique is unsatisfactory in that it requires the adhesive application of a foil in an additional step, it leaves the foil exposed and accessible to damage and it weakens the structure of the part since the foil can be torn away. This technique has therefore achieved little success.

SUMMARY OF THE INVENTION

It is one object of the invention, therefore to provide an improved pultruded part and a method for manufacturing a pultruded part in which the moisture vapour transmission or MVT is significantly improved.

According to the first aspect of the invention, therefore, there is provided a method of manufacturing a pultruded part comprising collating a plurality of reinforcing structures which are longitudinally continuous, each structure having a plurality of reinforcing fibers, impregnating the structures with a settable resin, passing the collated structures through a die to form the structures into a required shaped part, causing the resin to set to form the shaped part, applying a pulling force to the part when set, and introducing into the structures a layer of a moisture impermeable material at a position upstream of the die so that the layer is formed with the structures into the part.

According to a second aspect of the invention, therefore, there is provided a pultruded part comprising a plurality of reinforcing fibers, a settable resin material in which the fibers are embedded and a moisture impermeable foil layer extending continuously in a longitudinal direction of the part, the layer being at least partly covered on both sides by the reinforcing fibers.

According to a third aspect of the invention, therefore, there is provided a spacer for a sealed window unit comprising an elongate body having two spaced side surfaces each for engaging a glass pane such that that the glass panes are held spaced in the sealed window unit, a top surface for facing inwardly of an edge of the window unit, a bottom surface for facing outwardly of an edge of the window unit and a hollow interior surrounded by said surfaces, the spacer being formed by pultrusion from a thermosetting resin material reinforced by a fibrous material and including a layer of a moisture impermeable material embedded in the resin material so that it extends continuously longitudinally of the spacer and across at least the bottom surface, the layer being at least partly covered on both sides thereof by said fibrous material.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

A sealed window unit is a conventional item and as well known comprises a pair of panes 10 and 11 which lie parallel and are spaced at their side edges by spacers generally indicated at 12. Each of the spacers comprises an elongate body which is cut to length and joined at corners to form a frame system which fits inside the panes at the edges of the panes to the hold the panes in the required spaced position. In the embodiment shown in FIG. 2, the spacer is of the type which uses a double sealing system including a first portion of sealant 21 along the sides of the spacer and a second sealant 22 at the outer surface of the spacer. A covering layer of a further sealing material is applied at 23. To accommodate the sealant material 21, each of the side surfaces is slightly recessed.

Figure 3:
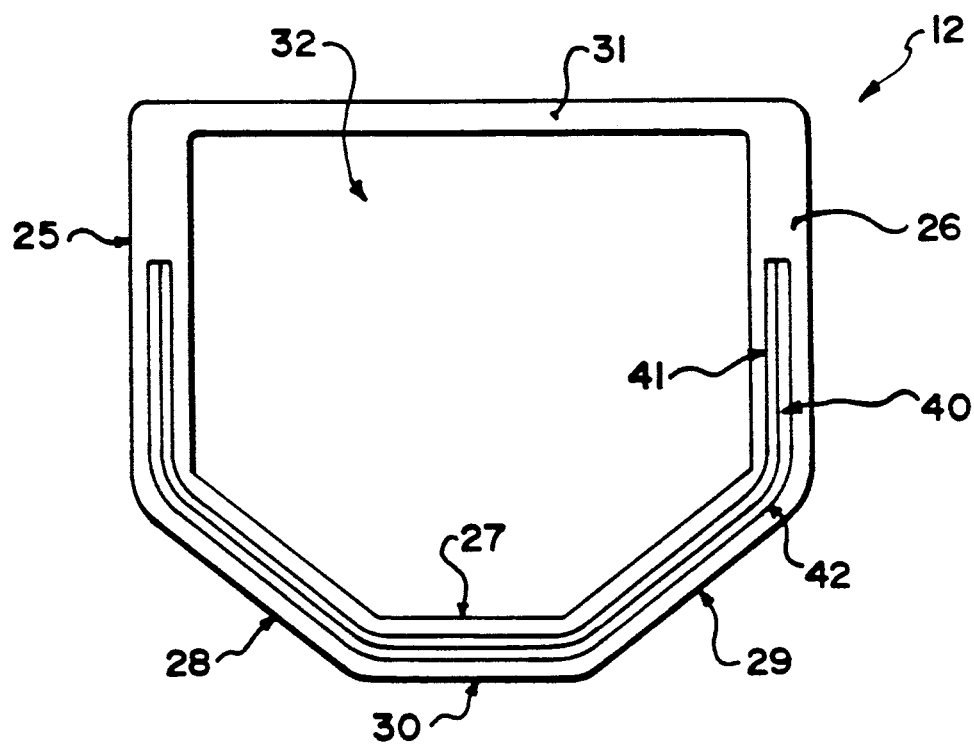
FIG. 3 is a cross sectional view of a spacer according to the invention on an enlarged scale and of a different type from the spacer shown in FIG. 2.

A second type of spacer element is shown in FIG. 3 in which the side surfaces 25 and 26 are substantially flat and a bottom surface 27 includes a pair of inclined portions 28 and 29 which extend downwardly toward a lowermost portion 30 thus defining a larger area for receiving the additional amount of sealing material around the edge to make up for the absence of sealing material at the sides.

Figure 2:
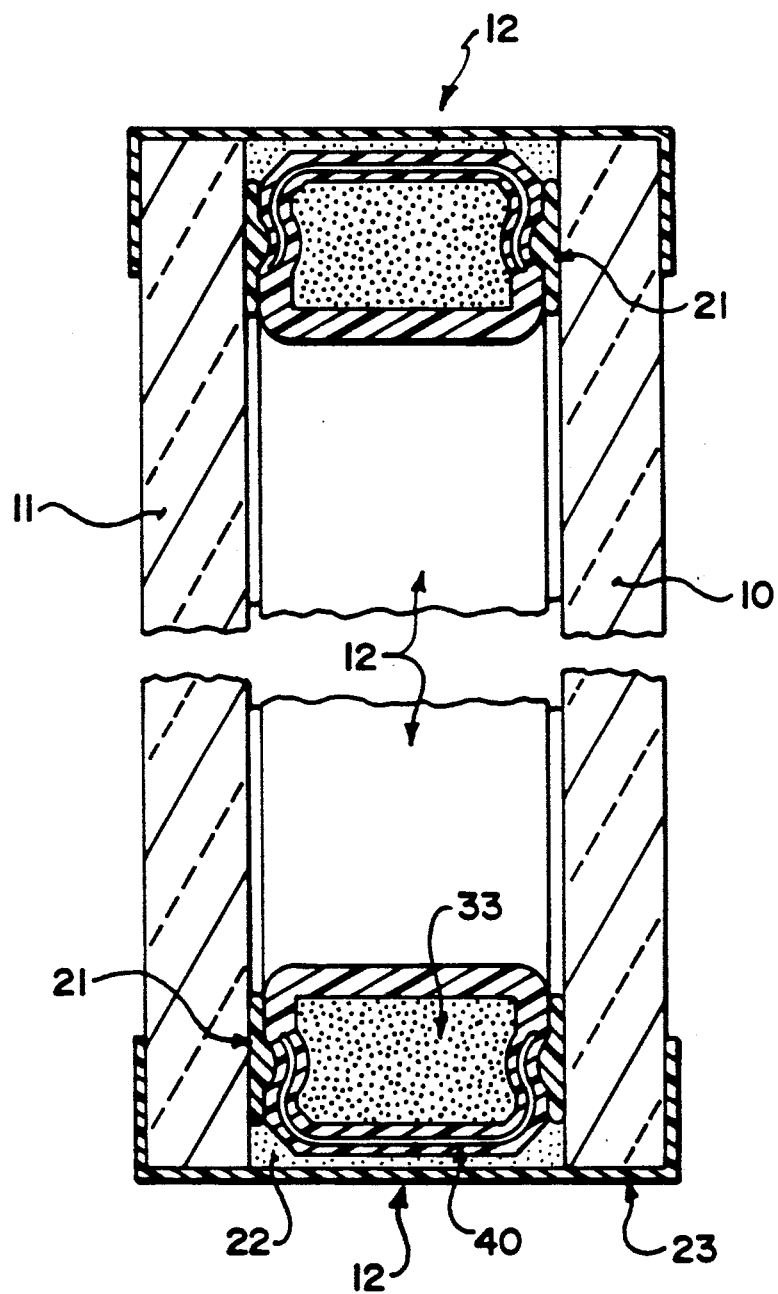
FIG. 2 is a cross sectional view of a sealed window unit incorporating a spacer according to the invention.

Generally, therefore, the spacer element has a top surface 31, the sides 25 and 26 and a bottom surface 27. The spacer shown in FIG. 2 is of a similar configuration although as described above the design is slightly different. The four surfaces surround a hollow interior 32 which can be filled with a desicant as indicated at 33 in FIG. 2.

Figure 1:
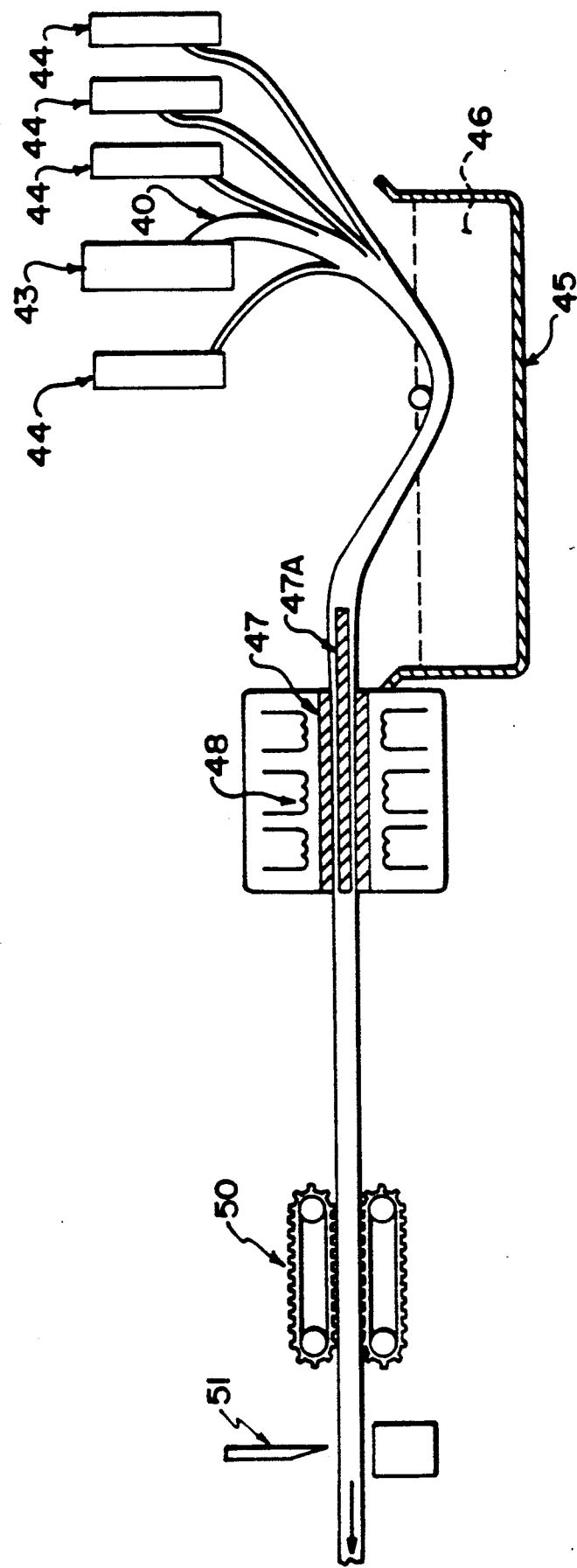
FIG. 1 is a schematic side elevational view of a pultrusion system according to the invention.

The general structure of the sealed window unit and the spacer element are shown for example in European patent application no: 113209 published July 11th, 1984. In addition the general system of the pultrusion technique shown in FIG. 1 is also described in more detail in the above European patent application and is known to those skilled in the art.

Turning therefore now to the details of the present invention, the spacer element is modified in two ways. Firstly the spacer element is formed so it includes embedded within the element a layer 40 consisting of a foil layer 41 and a mat layer 42. The layer 40 is supplied to the pultrusion process on a supply reel 43 and in addition to the pultrusion process is supplied a plurality of rovings on reels or spools 44. The supply material is collated into a bundle of material which is dipped into a bath 45 of a suitable thermosetting resin 46 so that the bundle or collation of the fiber elements or structures is impregnated with the thermosetting resin. The impregnated bundle is then fed into a die 46 which has a mandrel 47 so that the die and mandrel cooperate to shape the spacer into the four sides and the hollow interior described above. The die includes heating elements 48 which set the thermosetting material into the required shape while the material is held in the shape by the elongate die. Downstream of the die the set part is pulled from the die by a pulling system indicated at 50 and is subsequently cut to required lengths by a cutting system 51. The layer 40 comprises a continuous tape or strip of material carrying foil on one side and a fibrous mat on the other side adhesively attached to the foil. The mat comprises bi-directional fibers preferably of glass and generally in nonwoven form although other forms may be possible. The width of the layer 40 is chosen so that it takes up the position shown in FIGS. 2 and 3 that is it extends from one end at a position at a mid-height of the side wall 25, across the bottom wall 27 and to a position mid-height of the side wall 26. The layer is continuous from one edge to the other edge. The foil portion of the layer is impervious to moisture or moisture vapour so that the lower portion of this spacer as shown in FIG. 3 is substantially totally impervious to moisture vapour transmission. The layer is formed in the pultrusion process so that the foil is covered on both surfaces by the fiber reinforcements. One side of the layer carries the mat which may or may not be covered by further layers of roving and the other layer of the foil is covered by the layers of roving so the foil is held away from the inner surface of the die and is fully embedded within the part when the part is complete. The control of the rovings and the layer as they are fed toward the die so that the required positioning is obtained is well known to one skilled in the art and can be properly controlled so that the layer remains continuously at the buried position throughout the continuous manufacture of the spacer element.

The thickness of the walls of the element are arranged such that the thickness at the position containing the layer 40 is greater than the thickness at the remaining part. Thus for example the thickness of the upper wall 31 may be of the order of 0.055 inches and the thickness of the part containing the layer 40 may be of the order of 0.070 inches. This design of the part has two advantages. Firstly the reduction in thickness of the upper wall 31 allows that wall to have an increased permeability to moisture vapour so that it is no longer necessary to provide a slot or other apertures in the upper wall to allow the moisture vapour in the area between the panes to reach the desicant. This moisture vapour can therefore be transmitted directly through the upper wall 31 and is gradually over time removed by the desicant 33.

Secondly the advantage in the design of the part by which the upper wall 31 is reduced in thickness allows the part to have an equalized drag on the die as it passes through the die. The layer 40 tends to increase the drag as it is passed through the die and it is necessary therefore to modify the remainder of the parts so that the drag is substantially equalized. This is obtained by reducing the thickness of the upper wall so that the forces on the upper wall are increased as it is formed thus increasing drag. The part can then be formed without a tendency to bow as it is passed through the die.

The manufacture of the spacer element without the necessity for a central slot for communication of the moisture vapour to the desicant allows the element to be manufactured with thinner wall structure thus reducing the amount of material and accordingly the cost.

The element as shown in FIG. 3 is formed substantially wholly from the thermosetting resin which is reinforced solely by roving material which is uni-directional and by the layer 40.

Figure 4:
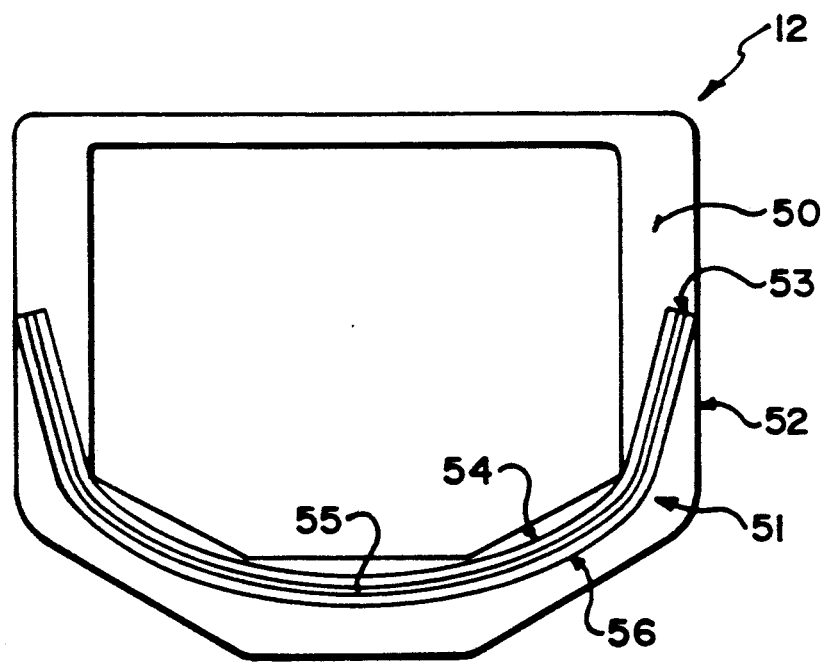
FIG. 4 is a cross-sectional view of a further spacer according to the invention.

Turning now to FIG. 4, this figure is similar to FIG. 3 in that it includes a spacer as described indicated at 50 which has the moisture permeable layer 51 embedded during the manufacturing technique as previously described. In this case, however, the layer is carefully inserted into the body of the spacer so that it approaches as closely as possible or reaches the outer surface 52 of the spacer at the sides of the spacer. Thus the outermost edge of the layer indicated at 53 lies in or contacts the surface 52 so that the moisture impermeability extends from one side edge of the spacer to the opposed side edge without any path of permeability along the sides of the spacer.

In addition in this case the layer generally indicated at 51 is modified in that it comprises a three part laminate defined by three layers 54, 55 and 56. The central layer 55 is formed of the foil material to provide the moisture impermeability. This layer is arranged to be as thin as possible so that the layer itself does not define sufficient strength to undergo the processing. In this case the layer is supported by the laminated covering layers 54 and 56 each of which covers a respective side of the foil. The laminating layers provide the necessary strength for the product to undergo the processing in the manufacture of the spacer. Thus they act as supporting layers to carry the material into the part. Secondly the laminating layers 54 and 56 act to bond the foil layer into the part. The laminating layers in one example can be provided by a resin which is compatible with the thermosetting resin of which the part is manufactured. Thus the layer is of a type which bonds during the heat processing to the thermosetting resin. One example is the use of polyester for the layers and a similar polyester for the thermosetting resin so that boding automatically takes place to reduce the risk of delamination during use of the part.

Alternatively, the supporting layers can be formed of a paper material which has sufficient strength to transport the foil into the process and at the same time provides bonding wit the resin by the infiltration of the resin into the interstices of the layer.

Since various modifications can be made in my invention as hereinabove described, and may apparently widely different embodiments of same made within the spirit and scope of the claims without departing from such spirit and scope, it is intended that all matter contained in the accompanying specification shall be interpreted as illustrative only and not in a limiting sense.

I claim:

1. A pultruded spacer for a sealed window unit comprising an elongate body having two spaced side surfaces each for engaging a glass pane such that the glass panes are held spaced in the sealed window unit, a top surface for facing inwardly of an edge of the window unit, a bottom surface for facing outwardly of an edge of the window unit and a hollow interior surrounded by said surfaces, said top surface including means therein allowing communication of moisture through the top surface to the hollow interior, the spacer consisting of a thermoset resin material reinforced by a fibrous material, said fibrous material comprising a plurality of elongate fibrous elements extending continuously longitudinally of the elongate body, and an impermeable layer of a moisture impermeable material embedded in the resin material so that it extends continuously longitudinally of the spacer and continuously across the spacer from a position part way down one side surface, across the bottom surface to a position part way down the other side surface, the impermeable layer being fully covered on both sides thereof by said thermoset resin and said fibrous material, said impermeable layer comprising a laminate having a first layer of foil and a second layer formed of a supporting material and attached to the foil layer on one side thereof, the supporting material having a character to provide structural strength for the laminate to prevent tearing of the foil and effective bonding to the thermoset resin to prevent delamination of the body at the laminate.

2. The spacer according to claim 1 wherein said laminate includes a third layer attached to said foil layer on the side thereof opposed to said one side, said third layer being formed of a supporting material having a character to provide support structural strength for the laminate to prevent tearing and effective bonding to the thermoset resin to prevent delamination of the body at the laminate layer comprising a laminate having a first layer of foil, a second layer attached to the foil layer on one side thereof and a third layer attached to the foil layer on the side thereof opposed to said one side, each of said second and third layer being formed of a supporting material, the supporting material having a character to provide structural strength for the laminate to prevent tearing of the foil and effective bonding to the thermoset resin to prevent delamination of the body at the laminate.

3. The spacer according to claim 2 wherein the top surface is imperforate and has a wall thickness in a direction at right angles thereto which is less than the wall thickness of the bottom surface.

* * * * *